United States Patent
Nishioka et al.

(10) Patent No.: US 11,398,113 B2
(45) Date of Patent: Jul. 26, 2022

(54) TOLL CONTROL SYSTEM, TOLL CONTROL APPARATUS, TOLL CONTROL METHOD, AND COMPUTER-READABLE RECORDING MEDIUM

(71) Applicant: NEC Corporation, Tokyo (JP)

(72) Inventors: Itaru Nishioka, Tokyo (JP); Werner Wee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 17/052,372

(22) PCT Filed: May 7, 2018

(86) PCT No.: PCT/JP2018/017677
§ 371 (c)(1),
(2) Date: Nov. 2, 2020

(87) PCT Pub. No.: WO2019/215801
PCT Pub. Date: Nov. 14, 2019

(65) Prior Publication Data
US 2021/0241543 A1 Aug. 5, 2021

(51) Int. Cl.
*G07B 15/00* (2011.01)
*G07B 15/06* (2011.01)
(Continued)

(52) U.S. Cl.
CPC ............ *G07B 15/06* (2013.01); *G06N 20/00* (2019.01); *G07B 15/02* (2013.01); *G08G 1/0129* (2013.01); *G08G 1/0145* (2013.01); *G08G 1/052* (2013.01)

(58) Field of Classification Search
CPC ........ G07B 15/06; G07B 15/02; G06N 20/00; G08G 1/0129; G08G 1/0145; G08G 1/052;
(Continued)

(56) References Cited

U.S. PATENT DOCUMENTS 6,255,946 B1 * 7/2001 Kim ..................... G08B 13/184
250/221
9,547,986 B1 * 1/2017 Curlander .......... G01C 21/3492
(Continued)

FOREIGN PATENT DOCUMENTS

JP 2000-113247 A 4/2000
JP 2002-024982 A 1/2002
(Continued)

OTHER PUBLICATIONS

English translation of Written opinion for PCT Application No. PCT/JP2018/017677, dated Jun. 19, 2018.
(Continued)

*Primary Examiner* — Ojiako K Nwugo
(74) *Attorney, Agent, or Firm* — Sughrue Mion, PLLC

(57) ABSTRACT

A toll control apparatus 100 includes a traffic volume prediction unit 10 that predicts a future overall traffic volume on a first road 401 and a second road 402, a toll control unit 20 that outputs, with the predicted overall traffic volume and a predetermined road toll as inputs, a future traffic volume and a predicted traveling speed on the second road for a case where a toll on the second road is set to the predetermined road toll, and a toll optimization unit 30. The toll optimization unit 30 sets one or more road toll candidates, selects a road toll candidate for which the predicted traveling speed obtained by inputting the road toll candidate to the toll control unit 20 is greater than or equal to a threshold value, and sets the road toll candidate that maximizes the toll revenue for the second road among the selected road toll candidates.

20 Claims, 11 Drawing Sheets

(51) Int. Cl.
*G06N 20/00* (2019.01)
*G07B 15/02* (2011.01)
*G08G 1/01* (2006.01)
*G08G 1/052* (2006.01)

(58) Field of Classification Search
CPC ........ G08G 1/0116; G08G 1/04; G06Q 10/04; G06Q 2240/00; G06Q 50/30
See application file for complete search history.

(56) References Cited

U.S. PATENT DOCUMENTS

| | | |
|---|---|---|
| 2014/0032282 A1 | 1/2014 | Fu |
| 2014/0074750 A1* | 3/2014 | Norberg .................. G06F 13/42 |
| | | 710/305 |
| 2014/0122032 A1* | 5/2014 | Zou ...................... G08G 1/0141 |
| | | 703/2 |
| 2014/0172521 A1 | 6/2014 | Itaya et al. |
| 2017/0358025 A1* | 12/2017 | Varma .................. G06Q 20/145 |

FOREIGN PATENT DOCUMENTS

| | | |
|---|---|---|
| JP | 2002-203295 A | 7/2002 |
| JP | 2008-009639 A | 1/2008 |
| JP | 2016-146013 A | 8/2016 |
| WO | 2013/018656 A1 | 2/2013 |

OTHER PUBLICATIONS

International Search Report for PCT Application No. PCT/JP2018/017677, dated Jun. 19, 2018.

\* cited by examiner

TOLL ROAD (SECTION$_{si}$)
$q_{si}$: TRAFFIC VOLUME
$v_{si}$: PREDICTED TRAVELING SPEED
$k_{si}$: TRAFFIC DENSITY
$p_{si}$: ROAD TOLL

Fig.7

| Relative time | Overall traffic volume [cars/10 min.] | Road toll [$] Reference → optimal | Temporal financial return [$] | (Toll road) Traffic volume [cars/10 min.] | (Toll road) Predicted traveling speed [km/h] | (Toll road) Predicted traffic density [cars/km] |
|---|---|---|---|---|---|---|
| Now | 200 | 3.0 | 600 | 60 | 80 | 10 |
| +10 min. | 240 | 3.5→3.0 | 210→225 | (60)→75 | (80)→75 | (10)→15 |
| +20 min. | 300 | 5.0→6.0 | 500→540 | (100)→90 | (70)→75 | (40)→35 |
| +30 min. | 420 | 8.0→9.0 | 1360→1260 | (170)→140 | (30)→50 | (60)→45 |
| ... | ... | ... | ... | ... | ... | ... |
| +90 min. | 320 | 7.0→7.0 | 840→840 | (120)→120 | (55)→55 | (45)→45 |

Example of maximum toll (upper limit) = $20

- Max. toll not exceeded:

- Max. toll exceeded:

TOLL CONTROL SYSTEM, TOLL CONTROL APPARATUS, TOLL CONTROL METHOD, AND COMPUTER-READABLE RECORDING MEDIUM

This application is a National Stage Entry of PCT/JP2018/017677 filed on May 7, 2018, the contents of all of which are incorporated herein by reference, in their entirety.

TECHNICAL FIELD

The present invention relates to a toll control system for controlling road traffic volume and road toll, a toll control apparatus that are used in the system, a toll control method, and to a computer-readable recording medium that includes a program recorded thereon for realizing the system, apparatus and method.

BACKGROUND ART

In recent years, toll control systems that vary the road toll on toll roads for the purpose of adjusting the traffic volume according to traffic conditions have been proposed in order to alleviate traffic congestion in urban areas (e.g., refer to Patent Document 1). Various countries are looking at introducing such a toll control system, and some countries have already introduced such a system.

Specifically, Patent Document 1 discloses a toll control system that sets the road toll using past data. The toll control system disclosed in Patent Document 1, first, estimates the traffic demand on a target day for every combination of an origin and a destination from past traffic data, and predicts traffic volume from the traffic volume distribution for each route and the estimated traffic demand. The toll control system disclosed in Patent Document 1 then sets a target value for distribution of the traffic volume on each route based on the predicted traffic volume, and corrects the initial road toll such that the set target value is achieved.

According to the toll control system disclosed in Patent Document 1, the traffic volume on each route can be controlled to achieve an appropriately volume based on past data, enabling traffic congestion in urban areas to be alleviated, and, thus, also conceivably allowing for improvement in the surrounding environment.

LIST OF RELATED ART DOCUMENTS

Patent Document

Patent Document 1: Japanese Patent Laid-Open Publication No. 2008-9639

SUMMARY OF INVENTION

Problems to be Solved by the Invention

Incidentally, given the many costs that are incurred in maintaining and managing roads, it is important to secure a financial return particularly with toll roads. In setting the road toll on toll roads, it is thus necessary to take into consideration not only traffic volume but also the financial return.

However, with the toll control system disclosed in Patent Document 1, only control aimed at optimizing the traffic volume distribution on each route is performed, and control aimed at securing a financial return from toll roads is not performed, thus possibly making it difficult to secure a financial return.

Furthermore, in the toll control system disclosed in Patent Document 1, traffic volume is predicted assuming that the road environment changes in a regular pattern, and thus it is difficult to respond to dynamic environmental changes on the road, such as sudden traffic congestion caused by an accident, for example.

An example object of the invention is to provide a toll control system, a toll control apparatus, a toll control method and a computer-readable recording medium that solves the above problems and make it possible to respond to dynamic environmental changes on the road and to secure a financial return through road tolls.

Means for Solving the Problems

A toll control apparatus according to an example aspect of the invention is for, in a case where a second road that is a toll road bypassing a first road is established, controlling a road toll on the second road, the apparatus including:

a traffic volume prediction means that predicts a future overall traffic volume on the first road and the second road;

a toll control means that outputs, with the predicted overall traffic volume and a predetermined road toll as inputs, a future traffic volume and a predicted traveling speed on the second road for a case where the toll on the second road is set to the predetermined road toll; and a toll optimization means that sets the road toll on the second road, the toll optimization means setting one or more road toll candidates, selecting a road toll candidate for which a predicted traveling speed obtained by inputting the road toll candidate to the toll control means is greater than or equal to a threshold value, and setting, as the road toll on the second road, the road toll candidate that maximizes a toll revenue for the second road as calculated using the future traffic volume output by the toll control means, among the selected road toll candidates.

A toll control system according to an example aspect of the invention is for, in a case where a second road that is a toll road bypassing a first road is established, controlling a road toll on the second road, the system including:

a toll control apparatus that predicts a future traffic volume on the second road;

a toll display device that displays, on a screen, a set road toll on the second road; and a traffic sensor that outputs sensor data for detecting a number and a speed of vehicles traveling on the second road, the toll control apparatus including:

a traffic volume prediction means that predicts a future overall traffic volume on the first road and the second road;

a toll control means that outputs, with the predicted overall traffic volume and a predetermined road toll as inputs, a future traffic volume and a predicted traveling speed on the second road for a case where the toll on the second road is set to the predetermined road toll; and a toll optimization means that sets the road toll on the second road, and the toll optimization means setting one or more road toll candidates, selecting a road toll candidate for which a predicted traveling speed obtained by inputting the road toll candidate to the toll control means is greater than or equal to a threshold value, and setting, as the road toll on the second road, the road toll candidate that maximizes a toll revenue for the second road as calculated using the future traffic volume output by the toll control means, among the selected road toll candidates.

Also, a toll control method according to an example aspect of the invention is for, in a case where a second road that is a toll road bypassing a first road is established, controlling a road toll on the second road, the method including:

(a) a step of predicting a future overall traffic volume on the first road and the second road;

(b) a step of outputting, with the predicted overall traffic volume and a predetermined road toll as inputs, a future traffic volume and a predicted traveling speed on the second road for a case where the toll on the second road is set to the predetermined road toll; and (c) a step of setting the road toll on the second road, in the step (c), one or more road toll candidates being set, a road toll candidate for which a predicted traveling speed obtained by executing the step (b) using the road toll candidate as an input of the step (b) is greater than or equal to a threshold value being selected, and the road toll candidate that maximizes a toll revenue for the second road as calculated using the future traffic volume output in the executed step (b) being set as the road toll on the second road, among the selected road toll candidates.

Furthermore, a computer-readable recording medium according to an example aspect of the invention includes a program recorded thereon for, in a case where a second road that is a toll road bypassing a first road is established, controlling a road toll on the second road with a computer, the program including instructions that cause a computer to carry out:

(a) a step of predicting a future overall traffic volume on the first road and the second road;

(b) a step of outputting, with a predicted traffic volume and a predetermined road toll as inputs, a future traffic volume and a predicted traveling speed on the second road for a case where the toll on the second road is set to the predetermined road toll; and (c) a step of setting the road toll on the second road, in the step (c), one or more road toll candidates being set, a road toll candidate for which a predicted traveling speed obtained by executing the step (b) using the road toll candidate as an input of the step (b) is greater than or equal to a threshold value being selected, and the road toll candidate that maximizes a toll revenue for the second road as calculated using the future traffic volume output in the executed step (b) being set as the road toll on the second road, among the selected road toll candidates.

Advantageous Effects of the Invention

As described above, according to the invention, it becomes possible to respond to dynamic environmental changes on the road and to secure a financial return through road tolls.

BRIEF DESCRIPTION OF THE DRAWINGS

FIG. 7 shows an example of the result of executing steps A1 to A11 shown in FIG. 6 every 10 minutes.

EXAMPLE EMBODIMENTS

First Exemplary Embodiment

Hereinafter, a toll control system, a toll control apparatus, a toll control method and a program in a first example embodiment of the invention will be described with reference to FIGS. 1 to 6.

[System Configuration]

Figure 1:
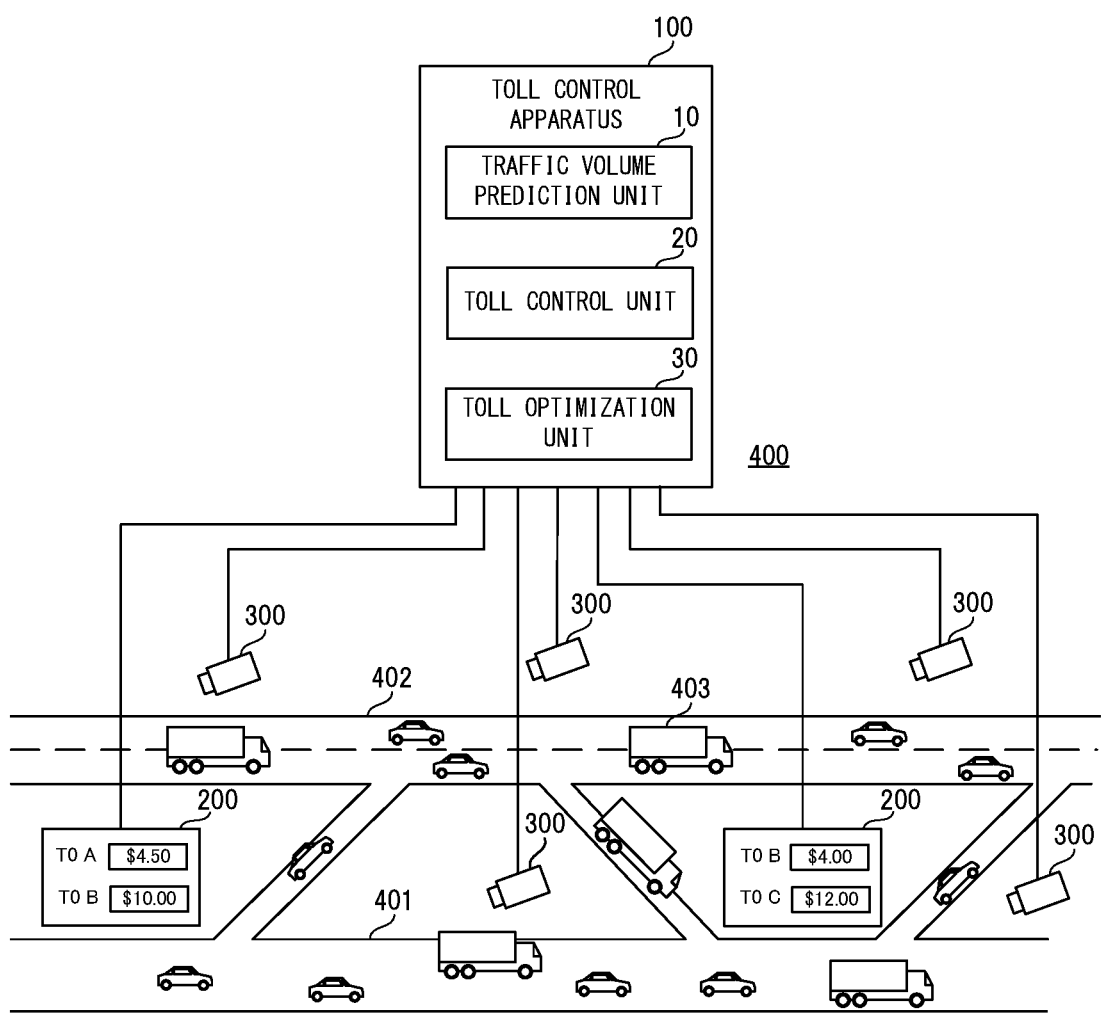
FIG. 1 is a configuration diagram showing a schematic configuration of a toll control system and a toll control apparatus in a first example embodiment of the invention.

Initially, schematic configurations of the toll control system and the toll control apparatus in this first example embodiment will be described using FIGS. 1 and 2. FIG. 1 is a configuration diagram showing schematic configurations of the toll control system and the toll control apparatus in the first example embodiment of the invention.

A toll control system 400 in this first example embodiment shown in FIG. 1 is a system for a toll control apparatus 100 to control the road toll on a second road 402, in the case where the second road 402 which is a toll road that bypasses a first road 401 has been established. Note that, in the following, the first road 401 will be described as a "public road" 401 and the second road 402 will be described as a "toll road", for convenience of description.

As shown in FIG. 1, the toll control system 400 is provided with the toll control apparatus 100, a toll display device 200, and a traffic sensor 300. The toll control apparatus 100 is an apparatus for executing the abovementioned road toll control, and sets the road toll on the second road. The configuration of the toll control apparatus 100 is shown in FIG. 2. The toll display device 200 displays the road toll set for the second road on a screen. The traffic sensor 300 outputs sensor data for detecting the number and speed of vehicles 403 traveling on the public road 401 and the toll road 402.

Figure 2:
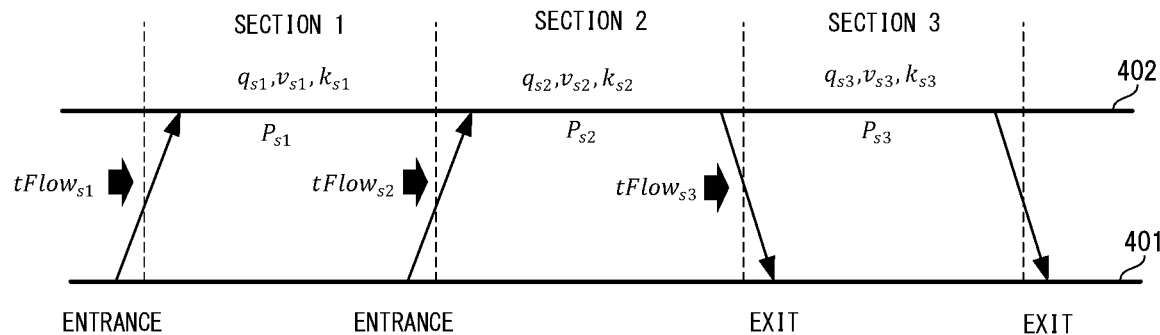
FIG. 2 is a configuration diagram more specifically showing the configuration of the toll control apparatus in the first example embodiment of the invention.
Figure 2:
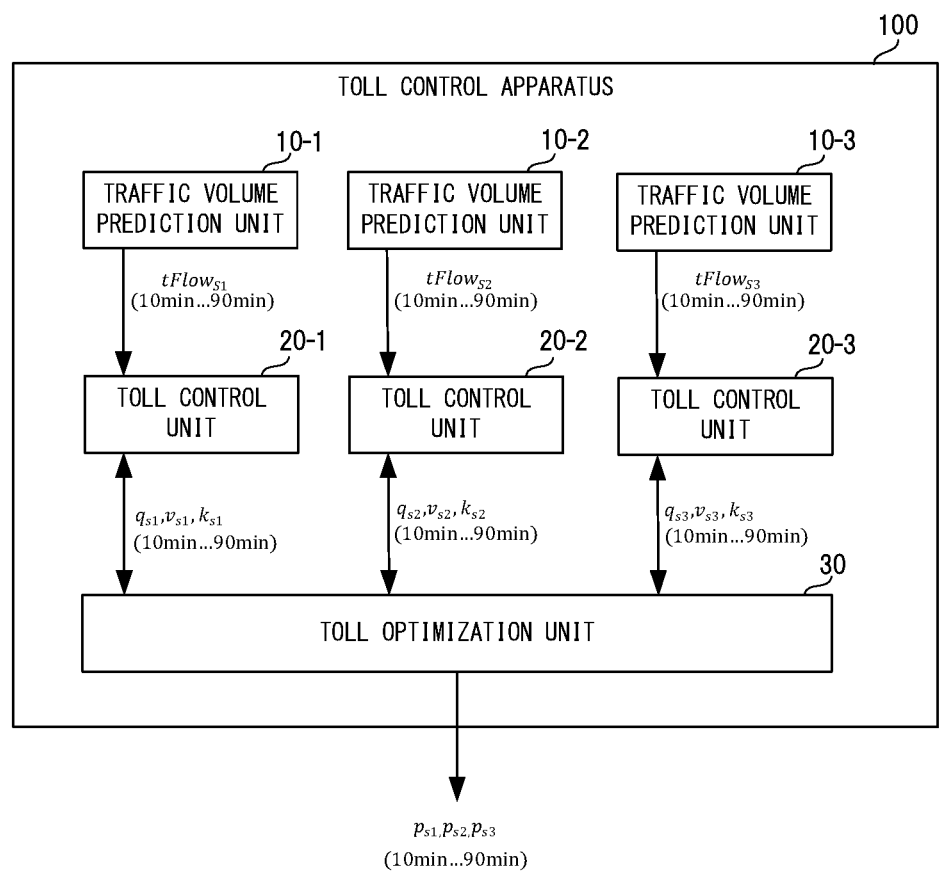

Also, as shown in FIG. 2, the toll control apparatus 100 is provided with a traffic volume prediction unit 10, a toll control unit 20, and a toll optimization unit 30 that sets the road toll on the toll road 402. Also, the traffic volume prediction unit 10 functions as traffic volume prediction means, the toll control unit 20 functions as toll control means, and the toll optimization unit 30 functions as toll optimization means.

The traffic volume prediction unit 10 predicts a future overall traffic volume on the public road 401 and the toll road 402, based on the number and speed of the vehicles 403 that are detected from sensor data output by the traffic sensor 300. The toll control unit 20 outputs, with the predicted overall traffic volume and a predetermined road toll as inputs, a future traffic volume and a predicted traveling speed on the second road for the case where the toll on the second road is set to the predetermined road toll.

The toll optimization unit 30, first, sets one or more road toll candidates, and selects a road toll candidate for which the predicted traveling speed obtained by inputting the set road toll candidate to the toll control unit 20 is greater than or equal to a threshold value. Next, the toll optimization unit 30 sets, as the road toll on the second road, the road toll candidate that maximizes the toll revenue for the second road as calculated using the future traffic volume output by the toll control unit 20, among the selected road toll candidates.

In this way, in this first example embodiment, prediction of overall traffic volume (i.e., traffic demand) that changes from one moment to the next is performed. Furthermore, in this first example embodiment, a toll control unit 20 is used that, upon receiving input of the predicted overall traffic volume and the road toll candidate, outputs a future traffic volume and a predicted traveling speed according to the input values. Thus, according to this first example embodiment, a road toll that raises the toll revenue can be set, while maintaining the traveling speed at or above a threshold value, making it possible to respond to dynamic environmental changes on the road and to secure a financial return through road tolls.

Also, in this first example embodiment, the toll display device 200 shown in FIG. 1 is installed on the public road 401 near an entrance to the toll road 402. The drivers of the vehicles 403 determine whether to travel on the second road after checking the road toll that is displayed on the toll display device 200. Also, the toll road 402 bypasses the public road 401, but does not necessarily run parallel to the public road 401. Furthermore, in this first example embodiment, the first road 401 may also be a toll road rather than a public road.

In addition, in this first example embodiment, the traffic sensor 300 is installed on the public road 401 and the toll road 402. Also, the traffic sensor 300 need only be a sensor capable of detecting the number and speed of the vehicles 403, specific examples of which include a camera and a depth sensor.

Figure 3:
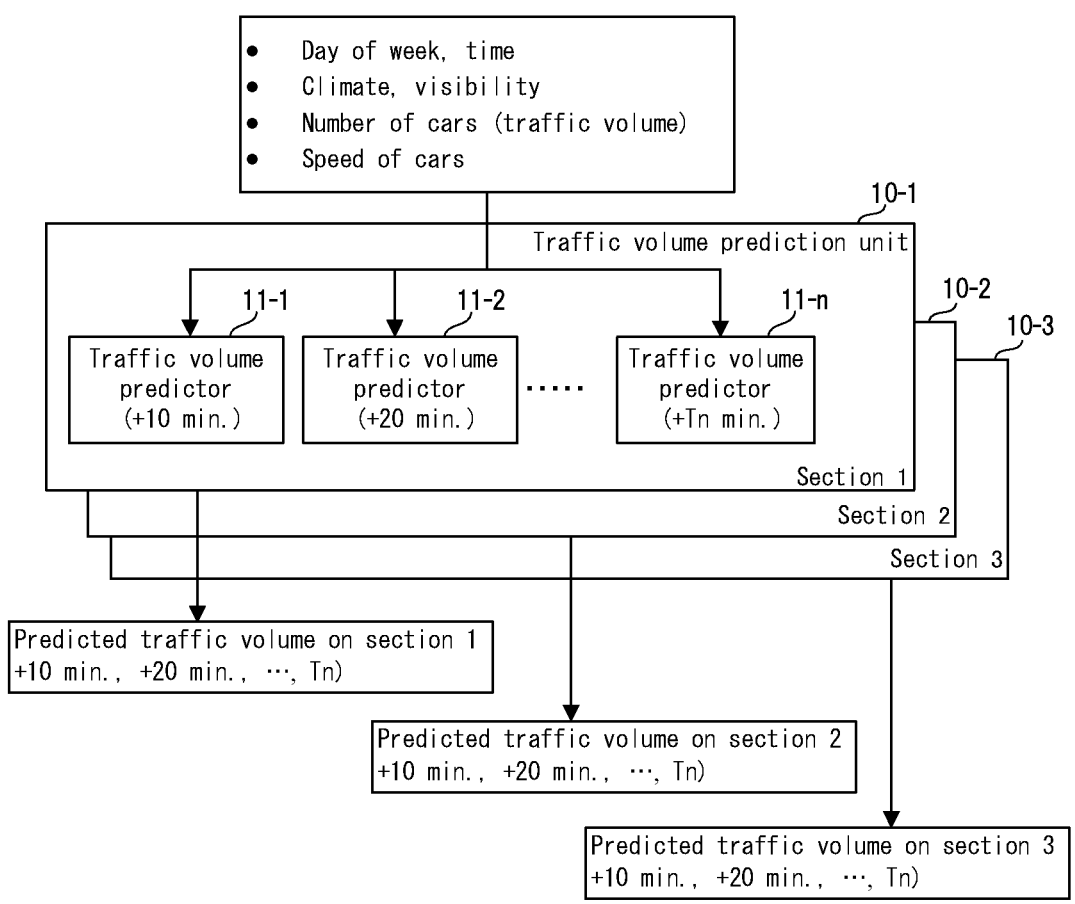
FIG. 3 is a block diagram more specifically showing the configuration of a traffic volume prediction unit shown in FIG. 2.
Figure 4:
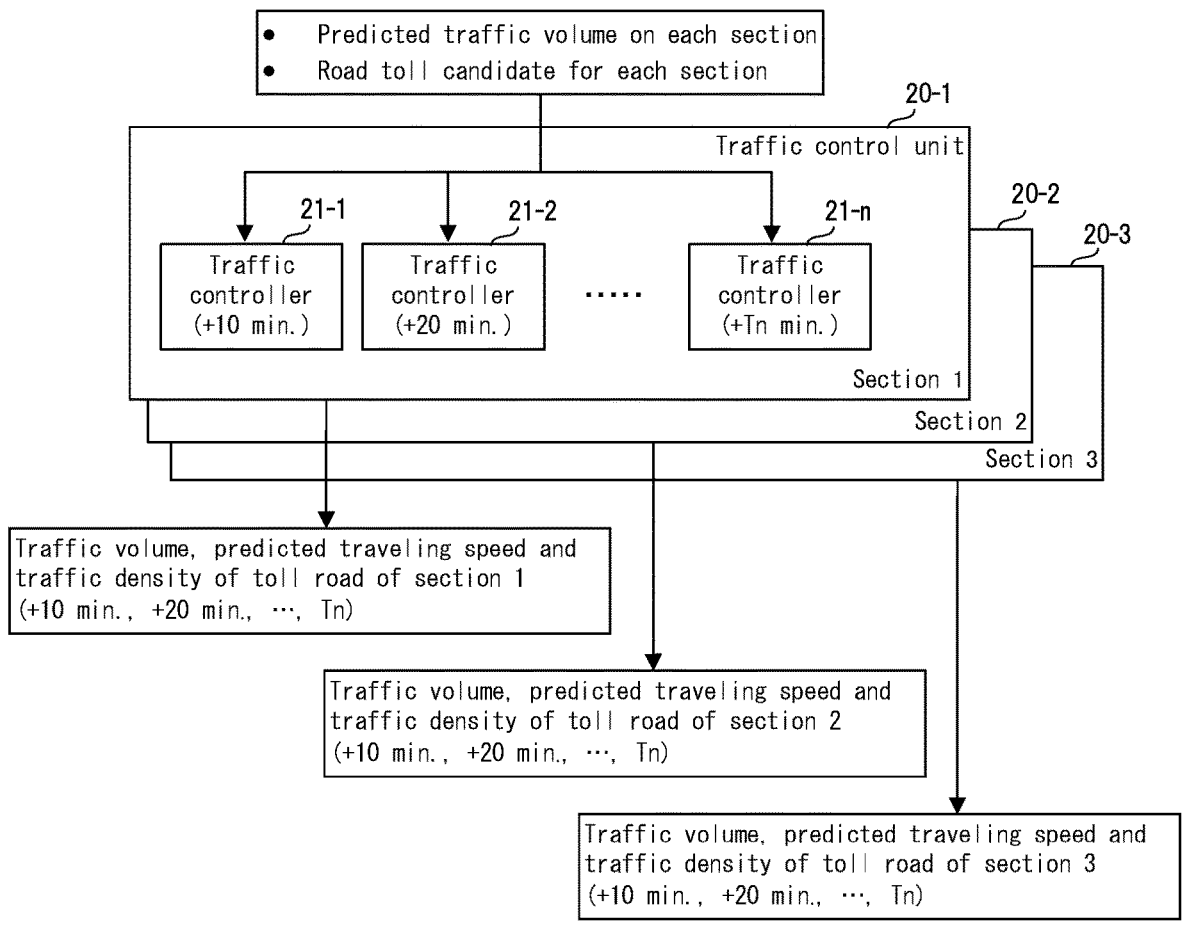
FIG. 4 is a block diagram more specifically showing the configuration of a toll control unit shown in FIG. 3.

Next, the configuration of the toll control apparatus 100 in this first example embodiment will be more specifically described, using FIGS. 2 to 6, in addition to FIG. 1. FIG. 2 is a configuration diagram more specifically showing the configuration of the toll control apparatus in the first example embodiment of the invention. FIG. 3 is a block diagram more specifically showing the configuration of the traffic volume prediction unit shown in FIG. 2. FIG. 4 is a block diagram more specifically showing the configuration of the toll control unit shown in FIG. 3.

First, as shown in FIG. 2, in this first example embodiment, sections are set on the public road 401 and the toll road 402 by the entrances and the exits. Thus, as will be described later, processing by the traffic volume prediction unit 10, the toll control unit 20 and the toll optimization unit 30 is performed for every section. Also, in the example of FIG. 2, three sections 1 to 3 are illustrated, but the number of the section is not limited in this first example embodiment. Furthermore, section 1 on the public road 401 and section 1 in the toll road 402 correspond to each other. This similarly applies to section 2 and section 3.

Also, in this example embodiment, the toll control apparatus 100 acquires sensor data output by the traffic sensor 300, and detects the number and speed of the vehicles 403 at the current time on the public road 401 and the toll road 402 using the acquired sensor data. Furthermore, the toll control apparatus 100 calculates the traffic volume and traffic density on the public road 401 and the toll road 402 at the current time using the detected number and speed.

The traffic volume prediction unit 10, in this first example embodiment, applies the calculated traffic volume at the current time to a predictive model, and predicts a future overall traffic volume tflow$_{Si}$ for every section $S_i$ set on the public road 401 and the toll road 402, as shown in FIG. 2.

Specifically, the toll control apparatus 100 is provided with traffic volume prediction units 10-1 to 10-3 for every section. Furthermore, as shown in FIG. 3, the traffic volume prediction units 10-1 to 10-3 are each provided with traffic volume predictors 11-1 to 11-$n$ (n: arbitrary natural number) for every elapsed time period (+T1 min., +T2 min., ..., +Tn min.) from a reference time.

Note that, in the example in FIG. 3, the elapsed time period is set at 10 minute intervals such as +10 minutes, +20 minutes, and so on. Also, the following description will refer to "traffic volume prediction unit 10", in the case where a specific traffic volume prediction unit is not indicated. Similarly, description will refer to "traffic volume predictor 11", in the case where a specific traffic volume predictor is not indicated.

In the traffic volume prediction units 10-1 to 10-3, the traffic volume predictors 11-1 to 11-$n$ each predict the overall traffic volume for the corresponding elapsed time period in the corresponding section, using the abovementioned predictive model.

Also, in this first example embodiment, the predictive model is built by machine learning that utilizes data specifying past traffic conditions, past meteorological data, and information specifying the day of week and time at which this data was acquired. Past traffic volume, past traffic density and past traveling speed are given as examples of data specifying the past traffic conditions. Climate, rainfall, humidity and visibility conditions are given as examples of past meteorological data. Also, deep learning is given as an example of a machine learning technique. Furthermore, machine learning techniques such as supervised learning can also be utilized as a machine learning technique. Support vector machines, naive Bayes classifiers and DNN (deep neural network) classifiers are given as examples of supervised learning techniques.

Furthermore, a linear regression model, an autoregressive model and an autoregressive moving average model are given as examples of predictive models. Specifically, a linear regression model defined in the following equation 1 is given as an example of a predictive model.

$$tFlow_{t+n} = \sum_i \alpha_i X_{t,i} + b \qquad \text{[Equation 1]}$$

In the above equation 1, t is the current time and t+n is the prediction target time (n=10, 20, ..., Tn). tflow$_{t+n}$ is the predicted traffic volume at the prediction target time. $X_{t,i}$ represents a factor (feature amount) affecting the traffic volume on a prediction target section $S_i$. As described above, information such as the number of vehicles 403 at the current time, speed, day of week and weather is utilized as $X_{t,i}$. Note that although only information on the current time is used here for simplification, past information prior to the current time and highly reliable future information on the weather and the like may also be used. Also, at is a weight parameter indicating the relationship between $tflow_{t+n}$ and $X_{t,i}$, and b is an intercept indicating the contribution of factors not included in learning data. The values of at and b are determined by the abovementioned machine learning.

Note that, in FIG. 2, in order to distinguish the traffic volume for every section predicted by the respective traffic volume prediction units 10, the overall traffic volume predicted by the traffic volume prediction unit 10-1 is denoted as $tflow_{S1}$, the overall traffic volume predicted by the traffic volume prediction unit 10-2 is denoted as $tflow_{S2}$, and the overall traffic volume predicted by the traffic volume prediction unit 10-3 is denoted as $tflow_{S3}$.

The toll control unit 20, in this example embodiment, as shown in FIG. 2, outputs a future traffic volume $q_{si}$ and a predicted traveling speed $v_{si}$ of a specific section $S_i$, with the overall traffic volume $tflow_{Si}$ predicted for the specific section $S_i$ and a predetermined road toll as inputs. The toll control unit 20 is also able to output a traffic density $k_{Si}$ of the specific section $S_i$.

Specifically, the toll control apparatus 100 is provided with toll control units 20-1 to 20-3 for every section. Furthermore, as shown in FIG. 4, the toll control units 20-1 to 20-3 are each provided with toll controllers 21-1 to 21-$n$, for every elapsed time period (+10 min., +20 min., . . . , +Tn min.) from a reference time. Also, the following description will refer to "toll control unit 20", in the case where a specific toll control unit is not indicated. Similarly, the following description will refer to "toll controller 21", in the case where a specific toll controller is not indicated.

In the toll control units 20-1 to 20-3, the toll controllers 21-1 to 21-$n$ each input the overall traffic volume $tflow_{Si}$ predicted for the corresponding section and elapsed time period and a predetermined road toll (road toll candidate) $p_t$ into a state model. The toll controllers 21-1 to 21-$n$ each thereby acquires, from the state model, a future traffic volume $q_t$, a predicted traveling speed $v_t$ and a traffic density $k_t$ of the corresponding section and elapsed time period for the case where the toll of the toll road 402 is set to the predetermined road toll $p_t$, and outputs these values to the toll optimization unit 30.

Also, the state model is a model defining the relationship between overall traffic volume, road toll and predicted traveling speed on the public road 401 and the toll road 402. More specifically, the state model defines the relationship between overall traffic volume, road toll and predicted traveling speed for every section. The model defined in the following equations 2 to 5 is given as a specific example of the state model.

In the following equations 2 to 5, a state model that is used by the toll control unit 20 is represented. Here, $y_t$ denotes an output vector (or matrix) and $u_t$ denotes an input vector (or matrix). $x_t$ is a parameter matrix indicating a space state model. A is a parameter matrix indicating the relationship between space state models of time t and time (t+1), B is a parameter matrix indicating the relationship between the input and the space state model of time (t+1), and C is a parameter matrix indicating the relationship between the output $y_t$ and the space state model at time t. The values of A, B, C and $x_t$ are determined by machine learning, based on past data. Specifically, these values are determined by a least squares method or the like that uses past traffic volume, past road toll, past traveling speed, past traffic density and the like as learning data, for example.

$$x_{t+1} = Ax_t + Bu_t \qquad \text{[Equation 2]}$$

$$y_t = Cx_t \qquad \text{[Equation 3]}$$

$$y_t = \begin{bmatrix} q_t \\ v_t \\ k_t \end{bmatrix} \qquad \text{[Equation 4]}$$

$$u_t = \begin{bmatrix} tFlow \\ p_t \end{bmatrix} \qquad \text{[Equation 5]}$$

The toll optimization unit 30, in this first example embodiment, first, sets a road toll candidate, for every section, and then inputs the set road toll candidate to the toll control unit 20, and, in the case where the output predicted traveling speed is greater than or equal to a threshold value, selects this road toll candidate.

In this first example embodiment, the toll optimization unit 30 is also able to select a road toll candidate for which the predicted traveling speed output by the toll control unit 20 is greater than or equal to a threshold value (minimum guaranteed speed), and that satisfies upper and lower limits that are determined by the traffic density output by the toll control unit 20.

Figure 5:
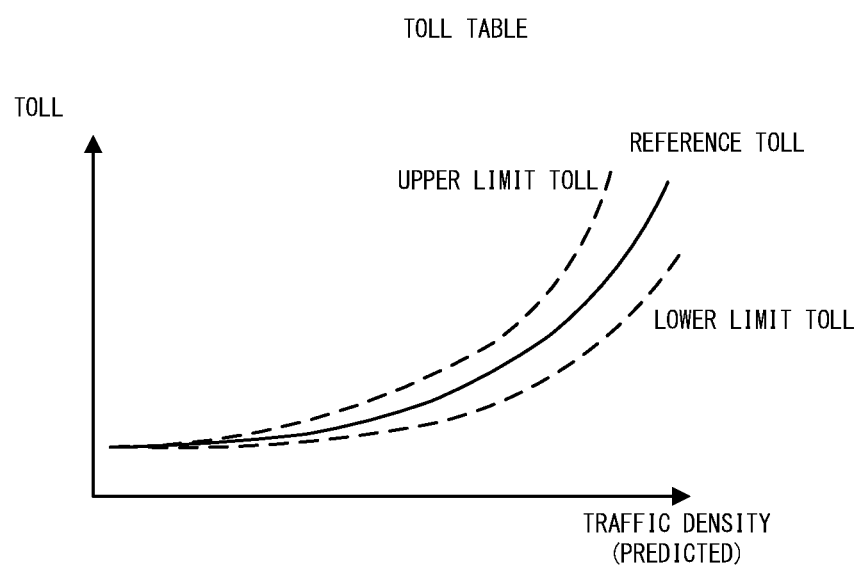
FIG. 5 is a diagram showing an example of an upper limit and a lower limit of a road toll that are set in the example embodiment of the invention.

In this first example embodiment, as shown in FIG. 5, the upper and lower limits are set based on a reference toll. FIG. 5 is a diagram showing an example of the upper and lower limits of the road toll that are set in the example embodiment of the invention. In the example in FIG. 5, the reference toll is set to increase monotonically when the traffic density increases. This is in order to avoid the traffic volume increasing too much, by reducing the number of vehicles entering to the toll road 402 as the traffic density increases. Also, the upper and lower limits of the road toll are preset on the basis of this reference toll. In the example in FIG. 5, the upper and lower limits are also set to increase monotonically when traffic density increases.

Specifically, the toll optimization unit 30, upon the road toll candidate $p_t$ being set for every section, inputs the predicted overall traffic volume $tflow_{Si}$ and the set road toll candidate $p_t$ to the respective toll controllers 21-1 to 21-$n$. Each toll controller thereby outputs a future traffic volume $q_t$, a predicted traveling speed $v_t$ and a traffic density $k_t$ of the toll road 402.

The toll optimization unit 30 selects the input road toll candidate $p_t$, in the case where the predicted traveling speed $v_t$ output by each toll controllers is greater than or equal to the threshold value, and, furthermore, the input road toll candidate $p_t$ is in a range of the upper and lower limits specified from the traffic density $k_t$. Also, setting and selection of the road toll candidate $p_t$ may be performed once, or may be performed a plurality of times within the range of the upper and lower limits.

Next, the toll optimization unit 30, upon the selection of road toll candidates ending, calculates, for every section, the toll revenue for that section, by multiplying one selected road toll candidate by the future traffic volume output by the toll control unit 20. The toll optimization unit 30 then specifies, for every section, the road toll candidate that maximizes the toll revenue, and takes the specified road toll candidate as the road toll for that section.

Specifically, the toll optimization unit 30 calculates the toll revenue, for every section, using the following equation 6, and specifies the road toll candidate that maximizes the toll revenue. In the following equation 6, Total Revenue on the left side shows the overall toll revenue for the toll road 402. Also, on the right side of equation 6, the first term indicates the toll revenue for the section 1, the second term indicates the toll revenue for the section 2, and the third term indicates the toll revenue for the section 3. H indicates the time period from the current time to the last prediction target time.

$$\text{Total Revenue} = \operatorname{argmax}_{p_{S2} \in P_{S2}} \Sigma_t^{t+H} p_{S1}(t) q_{S1}(t) + \operatorname{argmax}_{p_{S2} \in P_{S2}} \Sigma_t^{t+H} p_{S2}(t) q_{S2}(t) + \operatorname{argmax}_{p_{S2} \in P_{S2}} \Sigma_t^{t+H} p_{S3}(t) q_{S3}(t) \quad \text{[Equation 6]}$$

Note that, in this first example embodiment, as shown in FIG. 5, a restriction is placed on the road toll by setting upper and lower limits with respect to a reference toll, and the road toll is stably controlled on the basis of that restriction on the road toll, although this first example embodiment is not limited to this mode. This first example embodiment may be a mode in which the road toll is determined by solving equation 6, rather than placing a restriction of the upper and lower limits.

[System Operations]

Figure 6:
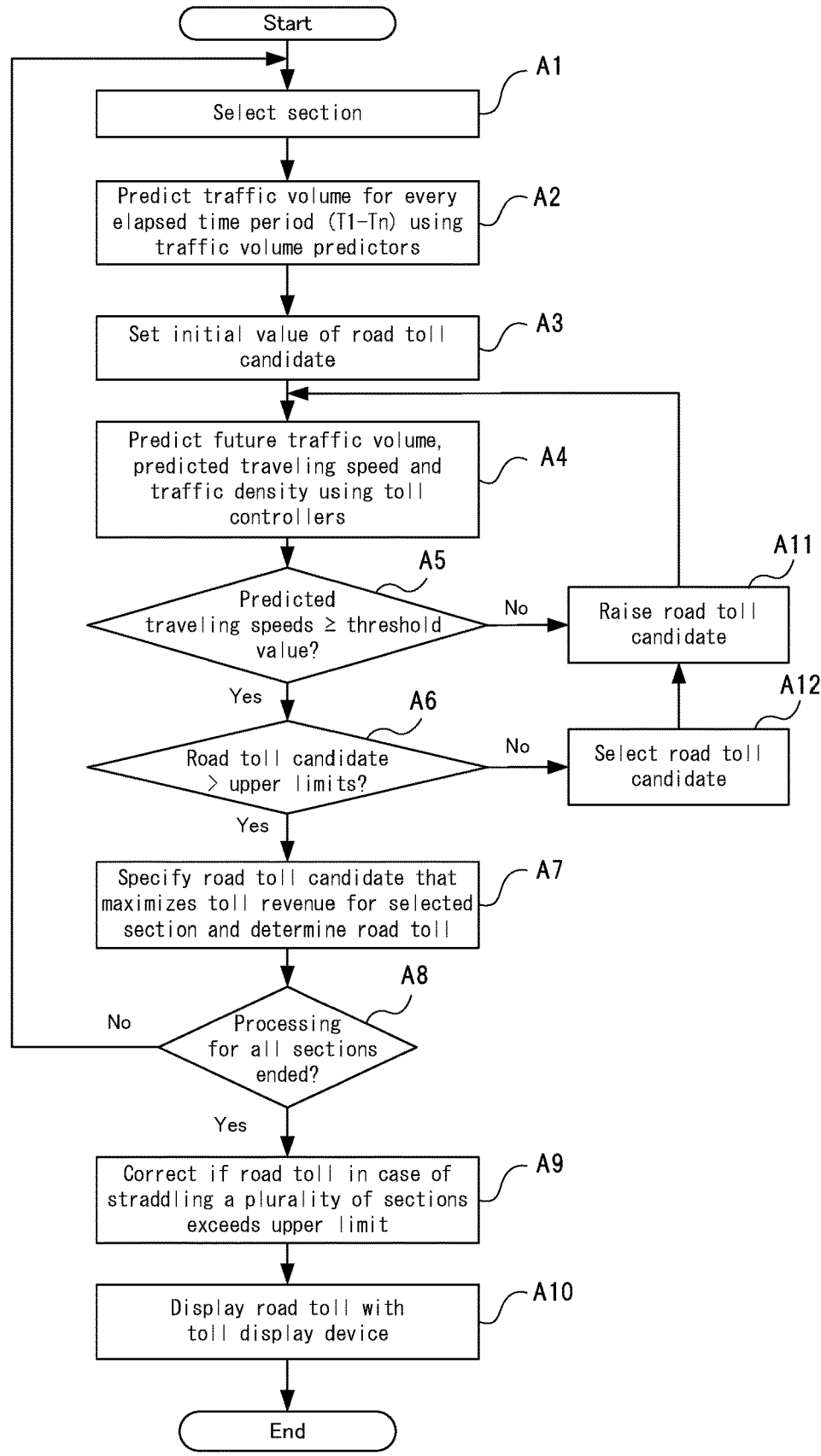
FIG. 6 is a flow diagram showing operations of the toll control apparatus in the first example embodiment of the invention.

Next, operations of the toll control system 400 and the toll control apparatus 100 in this first example embodiment will be described using FIG. 6. FIG. 6 is a flow diagram showing operations of the toll control apparatus in the first example embodiment of the invention. In the following description, FIGS. 1 to 5 will be referred to as appropriate. Also, in this first example embodiment, the toll control method is implemented by operating the toll control apparatus. Therefore, description of the toll control method in this first example embodiment will be replaced with the following description of the operations of the toll control apparatus 100.

As shown in FIG. 6, initially, the toll optimization unit 30 selects one section of the public road 401 and the toll road 402 (step A1). Also, the toll optimization unit 30 instructs the traffic volume prediction unit 10 corresponding to the selected section to start processing.

Next, the traffic volume prediction unit 10 instructed to start processing uses the traffic volume predictors 11-1 to 11-$n$ to predict the overall traffic volume tflow$_{t+n}$, using the predictive model, for every elapsed time period (+T1 min., +T2 min., . . . , +Tn min.) from a reference time (step A2).

Next, the toll optimization unit 30 sets an initial value $p_0$ of the road toll candidate for the section selected in step A1 (step A3). Specifically, the toll optimization unit 30 collates the traffic density calculated from the sensor data output by the traffic sensor 300 with the curve indicating the lower limit shown in FIG. 5, and sets the value of the collated lower limit as the initial value.

Next, the toll optimization unit 30 inputs the overall traffic volume tflow$_{t+n}$ for every elapsed time period predicted in step A2 and the road toll candidate $p_t$ to the respective toll controllers 21-1 to 21-$n$, and causes the toll controllers to predict the future traffic volume $q_t$, the predicted traveling speed $v_t$, and the traffic density $k_t$ (step A4).

Next, the toll optimization unit 30 determines whether all the predicted traveling speeds $v_t$ predicted in step A4 are greater than or equal to a threshold value (step A5). If the determination of step A5 indicates that all the predicted traveling speeds $v_t$ are not greater than or equal to the threshold value, the toll optimization unit 30 raises the road toll candidate $p_t$ (step A11), and executes step A4 again using the raised road toll candidate $p_t$.

On the other hand, if the determination of step A5 indicates that all the predicted traveling speeds $v_t$ are greater than or equal to the threshold value, the toll optimization unit 30 derives an upper limit for every traffic density $k_t$ predicted in step A4, and determines whether the road toll candidate $p_t$ exceeds any of the upper limits (step A6).

If the determination of step A6 indicates that the road toll candidate $p_t$ exceeds none of the upper limits, the toll optimization unit 30 selects the set road toll candidate $p_t$ (step A12). The toll optimization unit 30 then, furthermore, executes step A11, and thereafter executes step A4 again.

On the other hand, if the determination of step A6 indicates that the road toll candidate $p_t$ exceeds any one of the upper limits, the toll optimization unit 30 specifies the road toll candidate that maximizes the toll revenue in the section selected in step A1, among the road toll candidates $p_t$ selected in step A12. The toll optimization unit 30 then determines the specified road toll candidate as the road toll for that section (step A7).

Next, the toll optimization unit 30 determines whether processing has ended for all the sections (step A8). If the determination of step A8 indicates that processing for all the sections has not ended, the toll optimization unit 30 executes step A1 again.

On the other hand, if the determination of step A8 indicates that processing for all the sections has ended, the toll optimization unit 30 calculates the road toll in the case of straddling a plurality of sections, and, if the calculated road toll exceeds an upper limit, corrects the road toll (step A9). For example, assume that, in the case where the road toll is set to a maximum of $20 in the case of straddling a plurality of sections, the road toll for section 1 is $7 and the road toll for section 2 is $15. In this case, the road toll in the case of utilizing section 1 and section 2 is originally $22, but the road toll in this case is reduced to $20 as a result of the above step A9 (refer to FIG. 10 described later).

Thereafter, the toll optimization unit 30 displays, on the toll display device 200, the road toll finally determined after the end of step A9 (step A10).

Also, although processing in the processing in the toll control apparatus 100 ends with the execution of step A10, step A1 is executed again after a set time period (e.g., 10 min.) has elapsed. The road toll displayed on the toll display device 200 will thereby be updated as required.

Here, a specific example of the toll control by the toll control system 400 in this first example embodiment will be described using FIG. 7. FIG. 7 shows a specific example of the result in the case where steps A1 to A12 shown in FIG. 6 are executed every 10 minutes.

As shown in FIG. 7, the road toll changes over time. Also, in the example in FIG. 7, the reference toll is included for reference purposes. Also, with regard to traffic volume, speed and density, the values inside the parentheses are the values predicted by the toll control unit 20 from initial value of the road toll candidate, and the values outside the parentheses are values obtained after processing by the toll optimization unit 30.

Also, in the example in FIG. 7, an increase in traffic volume is achieved by reducing the toll after 10 minutes, and the financial return increases. Also, although the traffic volume decreases as a result of increasing the toll after 20 minutes, the financial return increases. Furthermore, the toll is increased after 30 minutes, in order to maintain the minimum guaranteed speed.

Effects of First Example Embodiment

As described above, according to this first example embodiment, a road toll that maximizes the toll revenue can be set, while maintaining the traveling speed at or above a threshold value, according to road conditions that change from one moment to the next. In other words, according to this first example embodiment, it becomes possible to respond to dynamic environmental changes on the road and to secure a financial return through road tolls.

[Program]

A program in this first example embodiment need only be a program that causes a computer to execute steps A1 to A12 shown in FIG. 6. The toll control apparatus 100 and the toll control method in this first example embodiment can be realized by this program being installed on a computer and executed. In this case, a processor of the computer performs processing while functioning as the traffic volume prediction unit 10, the toll control unit 20, and the toll optimization unit 30.

Also, the program in this example embodiment may be executed by a computer system built from a plurality of computers. In this case, for example, the computers may each function as one of the traffic volume prediction unit 10, the toll control unit 20, and the toll optimization unit 30.

Second Example Embodiment

Next, a toll control apparatus, a toll control method and a program in a second example embodiment of the invention will be described, with reference to FIGS. 8 to 10.

[System Configuration]

First, the toll control apparatus in this second example embodiment is constituted similarly to the toll control apparatus 100 in the first example embodiment shown in FIGS. 1 to 5. Therefore, in the following description, FIGS. 1 to 5 will be referred to as appropriate. In this second example embodiment, however, the processing in the toll optimization unit 30 differs from the first example embodiment. Hereinafter, description will be given focusing on the differences from the first example embodiment.

In this second example embodiment, the toll optimization unit 30, first, calculates, for every combination of an origin and a destination obtained using the origin and the destination of the respective sections, a weight using the traffic volume on the toll road 402 in the section corresponding to the combination.

Figure 8:
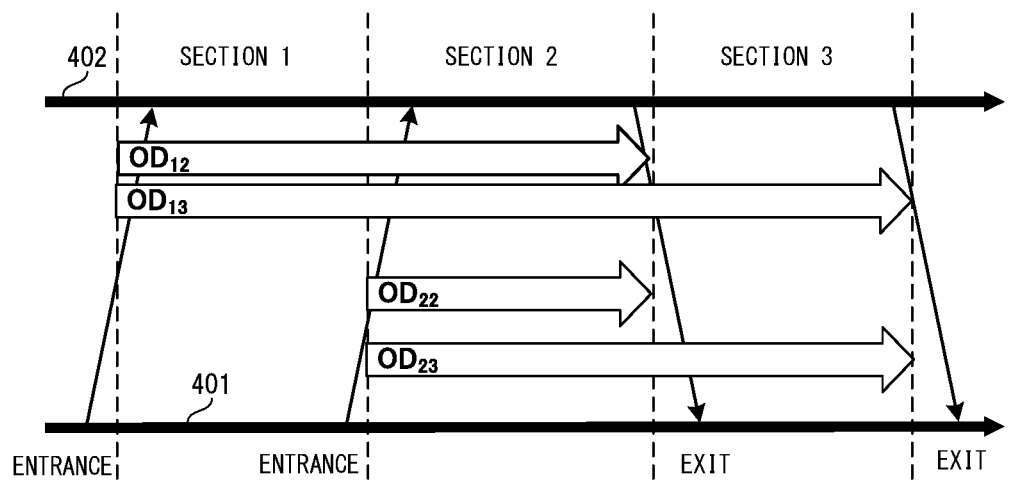
FIG. 8 is a diagram for describing processing that is performed by a toll optimization unit of a toll control apparatus in a second example embodiment of the invention.

FIG. 8 is a diagram for describing processing performed by the toll optimization unit of the toll control apparatus in the second example embodiment of the invention. In the example in FIG. 8, first, $OD_{12}$, $OD_{13}$, $OD_{22}$ and $OD_{23}$ are set from the respective origins and destinations of sections 1 to 3, as combinations of an origin and a destination (hereinafter, "OD pairs").

First, the traffic volumes on the toll road 402 for the sections corresponding to the OD pairs (hereinafter, "traffic volumes of the OD pairs") are totaled from records of entries and exits by the vehicles 403 at the entrances and exits, by a toll collection system (not shown in FIGS. 1 to 8) of the toll road 402, for example. The toll optimization unit 30 calculates a weight $OD^w_{ij}$ for each OD pair, using the totaled traffic volumes of the OD pairs. For example, if the number of cars that enter the toll road from the entrance of the section 1 and leave from the exit of the section 3 in a given time slot is 50, $OD_{13}$ will be 50. Similarly, assuming that $OD_{12}$ is $OD_{22}$ is 30 and $OD_{23}$ is 40, the weights of the respective OD pairs in this time slot will respectively be 1, 5, 3 and 4 for $OD^w_{12}$, $OD^w_{13}$, $OD^w_{22}$ and $OD^w_{23}$, where the weight $OD^w_{12}$ of $OD^w_{12}$ is 1.

The toll optimization unit 30 then calculates the toll revenue for the entirety of the toll road 402, using each calculated weight and the road toll candidate selected for every section, and specifies the road toll candidate that maximizes the toll revenue. Specifically, the toll optimization unit 30 calculates the toll revenue for the entirety of the toll road 402, using the following equation 7.

Total Revenue = [Equation 7]

$$\arg\max_{p_{si} \in P_{si}} \sum_t^{t+H} \{p_{s1}(t)q_{s1}(t) + p_{s2}(t)q_{s2}(t) + p_{s3}(t)q_{s3}(t)\} =$$

$$\arg\max_{p_{si} \in P_{si}} \sum_t^{t+H} [p_{s1}(t)\{OD^w_{12} + OD^w_{13}\}q_{s1}(t) +$$

$$p_{s2}(t)\{OD^w_{12} + OD^w_{13} + OD^w_{22} + OD^w_{23}\}q_{s2}(t) +$$

$$p_{s3}(t)\{OD^w_{13} + OD^w_{23}\}]q_{s3}(t)$$

[System Operations]

Next, operations of the toll control system and the toll control apparatus in this second example embodiment will be described using FIG. 9. FIG. 9 is a flow diagram showing operations of the toll control apparatus in the second example embodiment of the invention. In the following description, FIGS. 1 to 5 will be referred to as appropriate. Also, in this second example embodiment, the toll control method is implemented by operating the toll control apparatus. Therefore, description of the toll control method in this second example embodiment will be replaced with the following description of the operations of the toll control apparatus.

Figure 9:
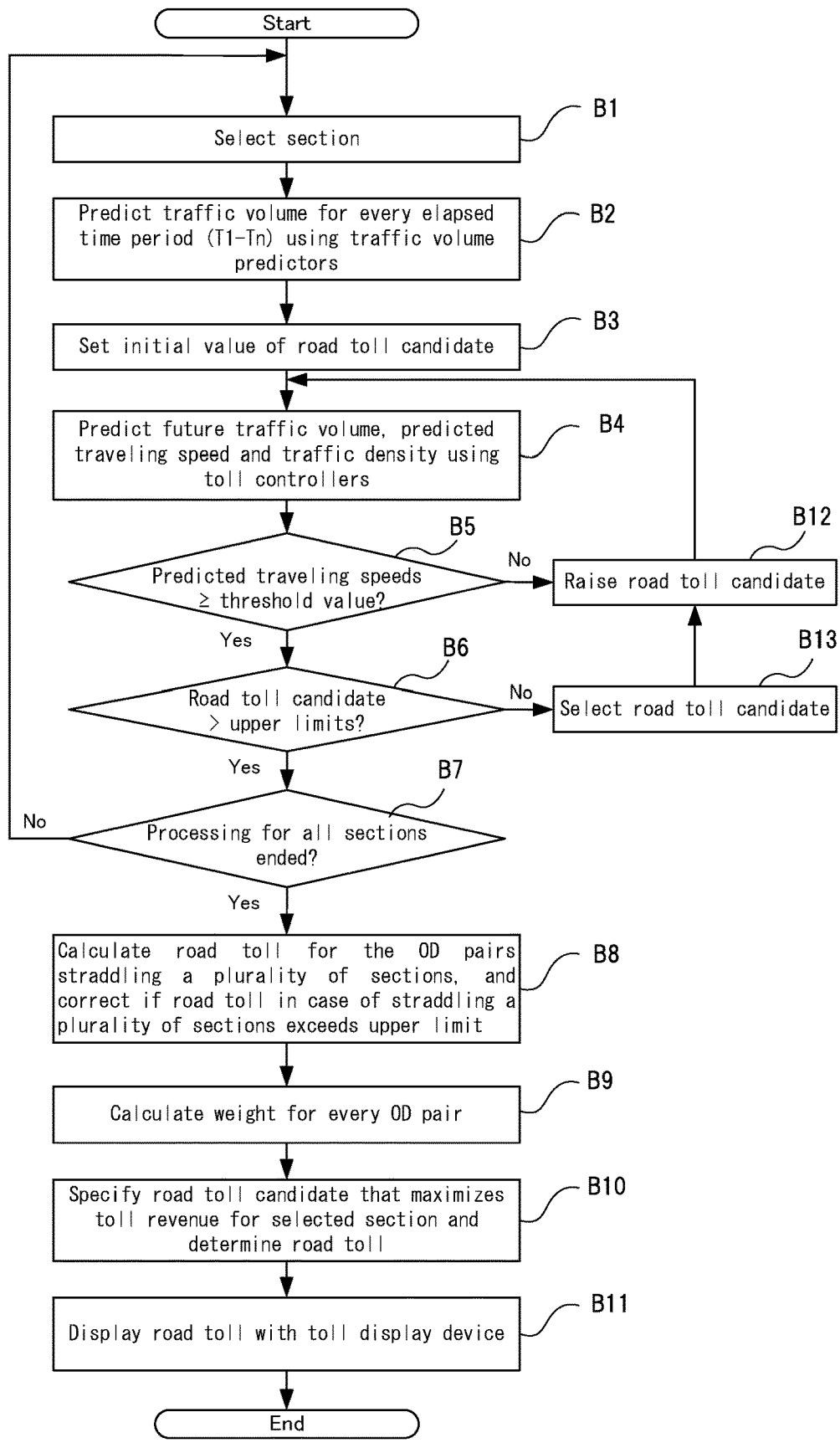
FIG. 9 is a flow diagram showing operations of the toll control apparatus in the second example embodiment of the invention.

As shown in FIG. 9, the toll optimization unit 30, first, selects one section of the toll road 402 (step B1). Step B1 is similar to step A1 shown in FIG. 6.

Next, the traffic volume prediction unit 10 instructed to start processing uses the traffic volume predictors 11-1 to 11-$n$ to predict the overall traffic volume tflow$_{t+n}$ using the predictive model, for every elapsed time period (+T1 min., +T2 min., . . . , +Tn min.) from a reference time (step B2). Step B2 is similar to step A2 shown in FIG. 6.

Next, the toll optimization unit 30 sets the initial value $p_0$ of the road toll candidate for the section selected in step B1 (step B3). Step B3 is similar to step A3 shown in FIG. 6.

Next, the toll optimization unit 30 inputs the overall traffic volume tflow$_{t+n}$ for every elapsed time period predicted in step B2 and the road toll candidate $p_t$ to the respective toll controllers 21-1 to 21-$n$, and causes the toll controllers to predict the future traffic volume $q_t$, the predicted traveling speed $v_t$, and the traffic density $k_t$ (step B4). Step B4 is similar to step A4 shown in FIG. 6.

Next, the toll optimization unit 30 determines whether all the predicted traveling speeds $v_t$ predicted in step B4 are greater than or equal to a threshold value (step B5). Step B5 is similar to step A5 shown in FIG. 6.

If the determination of step B5 indicates that all the predicted traveling speeds $v_t$ are not greater than or equal to the threshold value, the toll optimization unit 30 raises the road toll candidate $p_t$ (step B12), and executes step B4 again using the raised road toll candidate $p_t$. Step B12 is similar to step A10 shown in FIG. 6.

On the other hand, if the determination of step B5 indicates that all predicted traveling speed $v_t$ are greater than or equal to the threshold value, the toll optimization unit 30 derives an upper limit for every traffic density $k_t$ predicted in step B4, and determines whether the road toll candidate $p_t$ exceeds any of the upper limits (step B6). Step B6 is similar to step A6 shown in FIG. 6.

If the determination of step B6 indicates that the road toll candidate $p_t$ exceeds none of the upper limits, the toll optimization unit 30 selects the set road toll candidate $p_t$ (step B13). Step B13 is similar to step A11 shown in FIG. 6. The toll optimization unit 30 then, furthermore, executes step B12, and thereafter executes step B4 again.

On the other hand, if the determination of step B6 indicates that the road toll candidate $p_t$ exceeds any one of the upper limits, the toll optimization unit 30 determines whether processing has ended for all the sections (step B7). Step B7 is similar to step A8 shown in FIG. 6.

If the determination of step B7 indicates that processing for all the sections has not ended, the toll optimization unit 30 executes step B1 again.

On the other hand, if the determination of step B7 indicates that processing for all the sections has ended, the toll optimization unit 30 specifies an OD pair straddling a plurality of sections, and calculates a road toll for the specified OD pair, using the road toll candidate for every section selected in step B13. The toll optimization unit 30 then, if the calculated road toll exceeds an upper limit, corrects the road toll (step B8).

Here, step B8 will be described using FIG. 10. FIG. 10 is a diagram showing a specific example of the content of processing that is performed in step B8 shown in FIG. 9. In the example in FIG. 10, $20 is set the upper limit for the road toll of the OD pairs. Also, $OD_{12}$, $OD_{13}$, $OD_{22}$, and $OD_{23}$ are illustrated as OD pairs.

Figure 10:
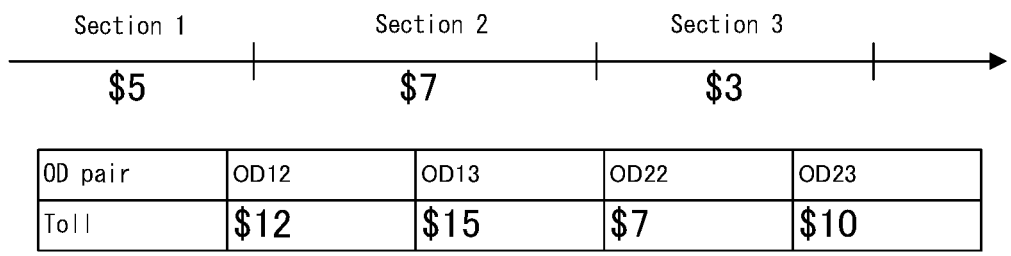
FIG. 10 is a diagram showing a specific example of the contents of processing performed in step B8 shown in FIG. 9.
Figure 10:
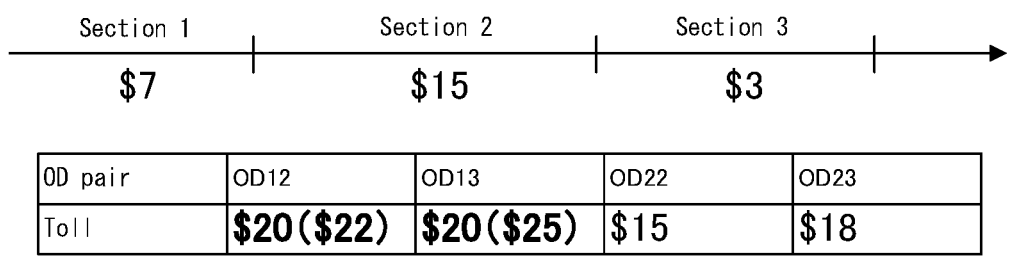

In the example in the upper part of FIG. 10, the road toll does not exceed the upper limit for any of the OD pairs, but in the example in the lower part, the road toll exceeds the upper limit for $OD_{12}$ and $OD_{13}$ straddling a plurality of sections. Thus, the toll optimization unit 30 reduces the road tolls for $OD_{12}$ and $OD_{13}$ to the upper limit.

Also, since the determination of whether the upper limit is exceeded is performed for the road toll candidate of every section in step B6, the toll optimization unit 30, in step B8, may perform processing on only the OD pairs straddling a plurality of sections.

Next, the toll optimization unit 30 calculates, for every OD pair, a weight for the OD pair, using the totaled traffic volume of the OD pair (step B9). Note that the traffic volume of the OD pairs is, as described above, totaled from the records of the toll collection system, for example.

Next, the toll optimization units 30 calculate the toll revenue for the entirety of the toll road 402, by applying the respective weights calculated in step B9, the road toll candidate selected for every section and the traffic volume predicted in step B4 to the above equation 7. The toll optimization unit 30 then specifies, for every section, the road toll candidate that maximizes the toll revenue, and determines the specified road toll candidate as the road toll for that section (step B10).

Thereafter, the toll optimization unit 30 causes the toll display device 200 to display the road toll determined in step B10 (step B11). Step B11 is similar to step A10 shown in FIG. 6.

Also, although processing in the processing in the toll control apparatus ends with the execution of step B11, step B1 is executed again after a set time period (e.g., 10 min.) has elapsed. The road toll displayed on the toll display device 200 will thereby be updated as required.

Effects of Second Example Embodiment

As described above, in this second example embodiment, it becomes possible to respond to dynamic environmental changes on the road and to secure a financial return through road tolls, similarly to the first example embodiment. Also, in this second example embodiment, given that the road toll is determined using a weight for every OD pair, it becomes possible to induce long distance users to use the toll road 402. Furthermore, as a result, according to this second example embodiment, substantial toll revenue can be expected from the sum of maximizing the toll revenue of every section according to the first example embodiment.

[Program]

A program in this second example embodiment need only be a program that causes a computer to execute steps B1 to B13 shown in FIG. 9. The toll control apparatus and the toll control method in this second example embodiment can be realized by this program being installed on a computer and executed. In this case, a processor of the computer performs processing while functioning as the traffic volume prediction unit 10, the toll control unit 20, and the toll optimization unit 30.

Also, the program in this example embodiment may be executed by a computer system built from a plurality of computers. In this case, for example, the computers may each function as one of the traffic volume prediction unit 10, the toll control unit 20, and the toll optimization unit 30.

[Physical Configuration]

Figure 11:
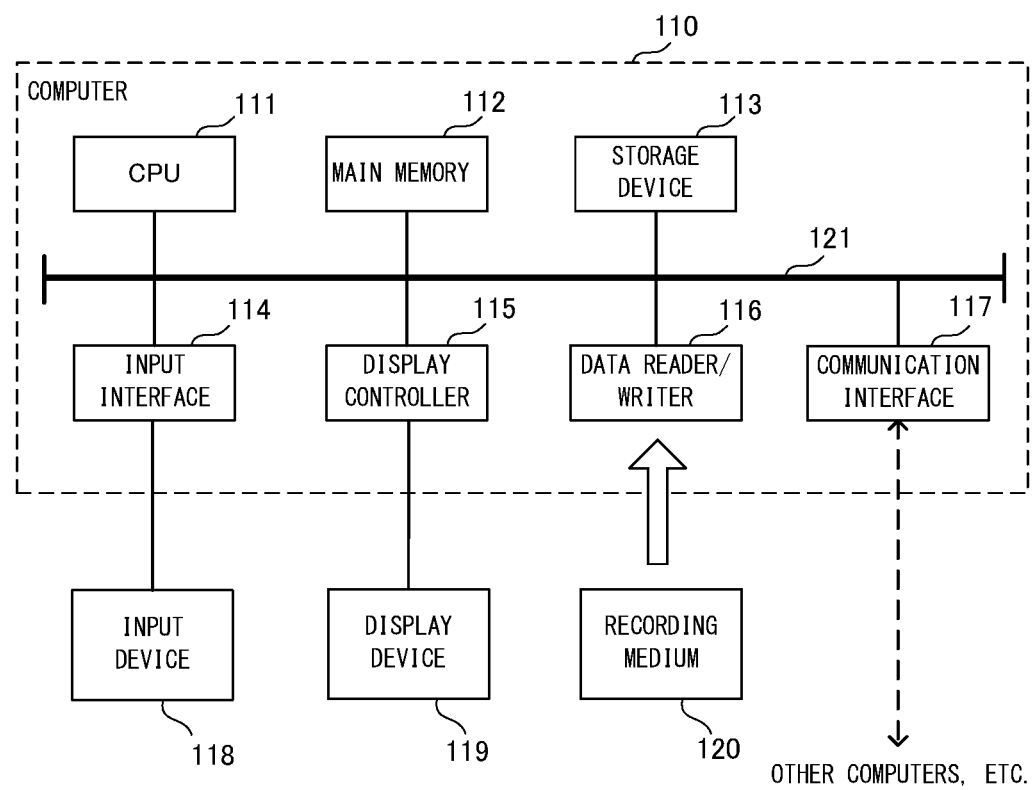
FIG. 11 is a block diagram showing an example of a computer that realizes the toll control apparatus in the first and second example embodiments of the invention.

Here, an example of a computer capable of realizing a toll control apparatus, by executing a program according to the first and second example embodiments will be described using FIG. 11. FIG. 11 is a block diagram showing an example of a computer that realizes the toll control apparatus according to the first and second example embodiments of the invention.

As shown in FIG. 11, a computer 110 includes a CPU (Central Processing Unit) 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting a program (codes) according to the example embodiments that are stored in the storage device 113 to the main memory 112, and executing these codes in predetermined order. The main memory 112, typically, is a volatile storage device such as a DRAM (Dynamic Random Access Memory). Also, programs in the example embodiment are provided in a state of being stored in a computer-readable recording medium 120. Note that programs according to the example embodiments may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that a toll control apparatus according to the example embodiments is also realizable by using hardware corresponding to the respective constituent elements, rather than by a computer on which programs are installed. Furthermore, the toll control apparatus may be realized in part by programs, and the remaining portion may be realized by hardware.

The example embodiments described above can be partially or wholly realized by supplementary notes 1 to 22 described below, but the invention is not limited to the following description.

(Supplementary Note 1)

A toll control apparatus for, in a case where a second road that is a toll road bypassing a first road is established, controlling a road toll on the second road, the apparatus including:

a traffic volume prediction means that predicts a future overall traffic volume on the first road and the second road;

a toll control means that outputs, with the predicted overall traffic volume and a predetermined road toll as inputs, a future traffic volume and a predicted traveling speed on the second road for a case where the toll on the second road is set to the predetermined road toll; and a toll optimization means that sets the road toll on the second road, the toll optimization means setting one or more road toll candidates, selecting a road toll candidate for which a predicted traveling speed obtained by inputting the road toll candidate to the toll control means is greater than or equal to a threshold value, and setting, as the road toll on the second road, the road toll candidate that maximizes a toll revenue for the second road as calculated using the future traffic volume output by the toll control means, among the selected road toll candidates.

(Supplementary Note 2)

The toll control apparatus according to supplementary note 1, in which the toll control means further outputs a traffic density on the second road for the case where the toll on the second road is set to the predetermined road toll, and the toll optimization means selects a road toll candidate for which the predicted traveling speed output by the toll control means is greater than or equal to the threshold value, and that satisfies an upper limit and a lower limit that are determined by the traffic density output by the toll control means.

(Supplementary Note 3)

The toll control apparatus according to supplementary note 1 or 2, in which the traffic volume prediction means predicts the overall traffic volume for every section set on the first road and the second road, the toll control means outputs, with a traffic volume predicted for a specific section and a predetermined road toll as inputs, a future traffic volume and a predicted traveling speed on the specific section, and the toll optimization means performs the setting of one or more road toll candidates and the selection of road toll candidates, for every section, and takes, as the road toll on the section, the road toll candidate that maximizes the toll revenue for an entirety of the second road or for the section as calculated using the future traffic volume output by the toll control means, among the selected road toll candidates.

(Supplementary Note 4)

The toll control apparatus according to supplementary note 3, in which the toll optimization means multiplies, for every section, the future traffic volume output by the toll control means by the road toll candidate input to the toll control means to calculate the toll revenue for the section.

(Supplementary Note 5)

The toll control apparatus according to supplementary note 3, in which the toll optimization means calculates, for every combination of an origin and a destination obtained using the origin and the destination of each of the sections, a weight using the traffic volume on the second road in the section corresponding to the combination, and calculates the toll revenue for the entirety of the second road, using the calculated weights and the road toll candidate selected for every section.

(Supplementary Note 6)

The toll control apparatus according to any of supplementary notes 1 to 5, in which the traffic volume prediction means predicts the overall traffic volume, using a predictive model built by machine learning that utilizes data specifying past traffic conditions on the first road and the second road and past meteorological data.

(Supplementary Note 7)

The toll control apparatus according to any of supplementary notes 1 to 6, in which the toll control means, by inputting the predicted overall traffic volume and a predetermined road toll into a state model defining a relationship between overall traffic volume on the first road and the second road, road toll and predicted traveling speed, outputs a future traffic volume and a predicted traveling speed on the second road for the case where the toll on the second road is set to the predetermined road toll.

(Supplementary Note 8)

A toll control system for, in a case where a second road that is a toll road bypassing a first road is established, controlling a road toll on the second road, the system including:

a toll control apparatus that predicts a future traffic volume on the second road;

a toll display device that displays, on a screen, a set road toll on the second road; and a traffic sensor that outputs sensor data for detecting a number and a speed of vehicles traveling on the second road, the toll control apparatus including:

a traffic volume prediction means that predicts a future overall traffic volume on the first road and the second road;

a toll control means that outputs, with the predicted overall traffic volume and a predetermined road toll as inputs, a future traffic volume and a predicted traveling speed on the second road for a case where the toll on the second road is set to the predetermined road toll; and a toll optimization means that sets the road toll on the second road, and the toll optimization means setting one or more road toll candidates, selecting a road toll candidate for which a predicted traveling speed obtained by inputting the road toll candidate to the toll control means is greater than or equal to a threshold value, and setting, as the road toll on the second road, the road toll candidate that maximizes a toll revenue for the second road as calculated using the future traffic volume output by the toll control means, among the selected road toll candidates.

(Supplementary Note 9)

A toll control method for, in a case where a second road that is a toll road bypassing a first road is established, controlling a road toll on the second road, the method including:

(a) a step of predicting a future overall traffic volume on the first road and the second road;

(b) a step of outputting, with the predicted overall traffic volume and a predetermined road toll as inputs, a future traffic volume and a predicted traveling speed on the second road for a case where the toll on the second road is set to the predetermined road toll; and (c) a step of setting the road toll on the second road, in the step (c), one or more road toll candidates being set, a road toll candidate for which a predicted traveling speed obtained by executing the step (b) using the road toll candidate as an input of the step (b) is greater than or equal to a threshold value being selected, and the road toll candidate that maximizes a toll revenue for the second road as calculated using the future traffic volume output in the executed step (b) being set as the road toll on the second road, among the selected road toll candidates.

(Supplementary Note 10)

The toll control method according to supplementary note 9, in which in the step (b), a traffic density on the second road for the case where the toll on the second road is set to the predetermined road toll is further output, and in the step (c), a road toll candidate for which the predicted traveling speed output in the executed step (b) is greater than or equal to the threshold value, and that satisfies an upper limit and a lower limit that are determined by the traffic density output in the executed step (b) is selected.

(Supplementary Note 11)

The toll control method according to supplementary note 9 or 10, in which in the step (a), the overall traffic volume is predicted for every section set on the first road and the second road, in the step (b), with a traffic volume predicted for a specific section and a predetermined road toll as inputs, a future traffic volume and a predicted traveling speed on the specific section are output, and in the step (c), the setting of one or more road toll candidates and the selection of road toll candidates are performed for every section, and the road toll candidate that maximizes the toll revenue for an entirety of the second road or for the section as calculated using the future traffic volume output in the executed step (b) is taken as the road toll on the section, among the selected road toll candidates.

(Supplementary Note 12)

The toll control method according to supplementary note 11, in which in the step (c), the future traffic volume output in the executed step (c) is multiplied by the road toll candidate used as an input in the executed step (b), for every section, to calculate the toll revenue for the section.

(Supplementary Note 13)

The toll control method according to supplementary note 11, in which in the step (c), for every combination of an origin and a destination obtained using the origin and the destination of each of the sections, a weight is calculated using the traffic volume on the second road in the section corresponding to the combination, and the toll revenue for the entirety of the second road is calculated, using the calculated weights and the road toll candidate selected for every section.

(Supplementary Note 14)

The toll control method according to any of supplementary notes 9 to 13, in which in the step (a), the overall traffic volume is predicted, using a predictive model built by machine learning that utilizes data specifying past traffic conditions on the first road and the second road and past meteorological data.

(Supplementary Note 15)

The toll control method according to any of supplementary notes 9 to 14, in which in the step (b), by inputting the predicted overall traffic volume and a predetermined road toll into a state model defining a relationship between traffic volume on the second road, road toll and predicted traveling speed, a future traffic volume and a predicted traveling speed on the second road for the case where the toll on the second road is set to the predetermined road toll are output.

(Supplementary Note 16)

A computer-readable recording medium that includes a program recorded thereon for, in a case where a second road that is a toll road bypassing a first road is established, controlling a road toll on the second road with a computer, the program including instructions that cause a computer to carry out:

(a) a step of predicting a future overall traffic volume on the first road and the second road;

(b) a step of outputting, with a predicted traffic volume and a predetermined road toll as inputs, a future traffic volume and a predicted traveling speed on the second road for a case where the toll on the second road is set to the predetermined road toll; and (c) a step of setting the road toll on the second road, in the step (c), one or more road toll candidates being set, a road toll candidate for which a predicted traveling speed obtained by executing the step (b) using the road toll candidate as an input of the step (b) is greater than or equal to a threshold value being selected, and the road toll candidate that maximizes a toll revenue for the second road as calculated using the future traffic volume output in the executed step (b) being set as the road toll on the second road, among the selected road toll candidates.

(Supplementary Note 17)

The computer-readable recording medium according to supplementary note 16, in which in the step (b), a traffic density on the second road for the case where the toll on the second road is set to the predetermined road toll is further output, and in the step (c), a road toll candidate for which the predicted traveling speed output in the executed step (b) is greater than or equal to the threshold value, and that satisfies an upper limit and a lower limit that are determined by the traffic density output in the executed step (b) is selected.

(Supplementary Note 18)

The computer-readable recording medium according to supplementary note 16 or 17, in which in the step (a), the overall traffic volume is predicted for every section set on the first road and the second road, in the step (b), with a traffic volume predicted for a specific section and a predetermined road toll as inputs, a future traffic volume and a predicted traveling speed on the specific section are output, and in the step (c), the setting of one or more road toll candidates and the selection of road toll candidates are performed for every section, and the road toll candidate that maximizes the toll revenue for an entirety of the second road or for the section as calculated using the future traffic volume output in the executed step (b) is taken as the road toll on the section, among the selected road toll candidates.

(Supplementary Note 19)

The computer-readable recording medium according to supplementary note 18, in which in the step (c), the future traffic volume output in the executed step (c) is multiplied by the road toll candidate used as an input in the executed step (b), for every section, to calculate the toll revenue for the section.

(Supplementary Note 20)

The computer-readable recording medium according to supplementary note 18, in which in the step (c), for every combination of an origin and a destination obtained using the origin and the destination of each of the sections, a weight is calculated using the traffic volume on the second road in the section corresponding to the combination, and the toll revenue for the entirety of the second road is calculated, using the calculated weights and the road toll candidate selected for every section.

(Supplementary Note 21)

The computer-readable recording medium according to any of supplementary notes 16 to 20, in which in the step (a), the future traffic volume is predicted, using a predictive model built by machine learning that utilizes data specifying past traffic conditions on the second road and past meteorological data.

(Supplementary Note 22)

The computer-readable recording medium according to any of supplementary notes 16 to 21, in which in the step (b), by inputting the predicted overall traffic volume and a predetermined road toll into a state model defining a relationship between traffic volume on the second road, road toll and predicted traveling speed, a future traffic volume and a predicted traveling speed on the second road for the case where the toll on the second road is set to the predetermined road toll are output.

Although the invention of the present application has been described above with reference to example embodiments, the invention is not limited to the foregoing example embodiments. Various modifications apparent to those skilled in the art can be made to the configurations and details of the invention of the present application within the scope of the invention.

INDUSTRIAL APPLICABILITY

As described above, according to the invention, it becomes possible to respond to dynamic environmental changes on the road and to secure a financial return through road tolls. The invention is useful in toll control systems that vary the road toll on toll roads.

LIST OF REFERENCE SIGNS 10, 10-1-10-3 Traffic volume prediction unit
11, 11-1-11-$n$ Traffic volume predictor
20, 20-1-20-3 Toll control unit
21, 21-1-21-$n$ Toll controller
30 Toll optimization unit
100 Toll control apparatus
110 Computer
111 CPU
112 Main memory
113 Storage device
114 Input interface
115 Display controller
116 Data reader/writer
117 Communication interface
118 Input device
119 Display device
120 Recording medium
121 Bus
200 Toll display device
300 Traffic sensor
400 Toll control system
401 First road (public road)
402 Second road (toll road)
403 Vehicle

What is claimed is:

1. A toll control apparatus comprising:
traffic volume prediction unit configured to predict a future overall traffic volume on a first road and a second road;
toll control unit configured to output, with the predicted overall traffic volume and a predetermined road toll as inputs, a future traffic volume and a predicted traveling speed on the second road for a case where the toll on the second road is set to the predetermined road toll; and
toll optimization unit configured to set the road toll on the second road, wherein
the toll optimization unit sets one or more road toll candidates, selects a road toll candidate for which a predicted traveling speed obtained by inputting the road toll candidate to the toll control unit is greater than or equal to a threshold value, and sets, as the road toll on the second road, the road toll candidate that maximizes a toll revenue for the second road as calculated using the future traffic volume output by the toll control unit, among the selected road toll candidates.

2. The toll control apparatus according to claim 1, wherein
the toll control unit further outputs a traffic density on the second road for the case where the toll on the second road is set to the predetermined road toll, and
the toll optimization unit selects a road toll candidate for which the predicted traveling speed output by the toll control unit is greater than or equal to the threshold value, and that satisfies an upper limit and a lower limit that are determined by the traffic density output by the toll control unit.

3. The toll control apparatus according to claim 1, wherein
the traffic volume prediction unit predicts the overall traffic volume for every section set on the first road and the second road,
the toll control unit outputs, with a traffic volume predicted for a specific section and a predetermined road toll as inputs, a future traffic volume and a predicted traveling speed on the specific section, and
the toll optimization unit performs the setting of one or more road toll candidates and the selection of road toll candidates, for every section, and takes, as the road toll on the section, the road toll candidate that maximizes the toll revenue for an entirety of the second road or for the section as calculated using the future traffic volume output by the toll control unit, among the selected road toll candidates.

4. The toll control apparatus according to claim 3, wherein
the toll optimization unit multiplies, for every section, the future traffic volume output by the toll control unit by the road toll candidate input to the toll control unit to calculate the toll revenue for the section.

5. The toll control apparatus according to claim 3, wherein
the toll optimization unit calculates, for every combination of an origin and a destination obtained using the origin and the destination of each of the sections, a weight using the traffic volume on the second road in the section corresponding to the combination, and
calculates the toll revenue for the entirety of the second road, using the calculated weights and the road toll candidate selected for every section.

6. The toll control apparatus according to claim 1, wherein the traffic volume prediction unit predicts the overall traffic volume, using a predictive model built by machine learning that utilizes data specifying past traffic conditions on the first road and the second road and past meteorological data.

7. The toll control apparatus according to claim 1, wherein the toll control unit, by inputting the predicted overall traffic volume and a predetermined road toll into a state model defining a relationship between overall traffic volume on the first road and the second road, road toll and predicted traveling speed, outputs a future traffic volume and a predicted traveling speed on the second road for the case where the toll on the second road is set to the predetermined road toll.

8. A toll control method comprising:
predicting a future overall traffic volume on a first road and a second road;
outputting, with the predicted overall traffic volume and a predetermined road toll as inputs, a future traffic volume and a predicted traveling speed on the second road for a case where the toll on the second road is set to the predetermined road toll; and
setting the road toll on the second road, wherein in the setting, one or more road toll candidates are set, a road toll candidate for which a predicted traveling speed obtained by executing the outputting using the road toll candidate as an input of the outputting is greater than or equal to a threshold value is selected, and the road toll candidate that maximizes a toll revenue for the second road as calculated using the future traffic volume output in the executed outputting is set as the road toll on the second road, among the selected road toll candidates.

9. The toll control method according to claim 8, wherein
in the outputting, a traffic density on the second road for the case where the toll on the second road is set to the predetermined road toll is further output, and
in the setting, a road toll candidate for which the predicted traveling speed output in the executed outputting is greater than or equal to the threshold value, and that satisfies an upper limit and a lower limit that are determined by the traffic density output in the executed outputting is selected.

10. The toll control method according to claim 8, wherein
in the predicting, the overall traffic volume is predicted for every section set on the first road and the second road,
in the outputting, with a traffic volume predicted for a specific section and a predetermined road toll as inputs, a future traffic volume and a predicted traveling speed on the specific section are output, and
in the setting, the setting of one or more road toll candidates and the selection of road toll candidates are performed for every section, and the road toll candidate that maximizes the toll revenue for an entirety of the second road or for the section as calculated using the future traffic volume output in the executed outputting is taken as the road toll on the section, among the selected road toll candidates.

11. The toll control method according to claim 10, wherein
in the setting, the future traffic volume output in the executed setting is multiplied by the road toll candidate used as an input in the executed outputting, for every section, to calculate the toll revenue for the section.

12. The toll control method according to claim 10, wherein
in the setting, for every combination of an origin and a destination obtained using the origin and the destination of each of the sections, a weight is calculated using the traffic volume on the second road in the section corresponding to the combination, and
the toll revenue for the entirety of the second road is calculated, using the calculated weights and the road toll candidate selected for every section.

13. The toll control method according to claim 8, wherein
in the predicting, the overall traffic volume is predicted, using a predictive model built by machine learning that utilizes data specifying past traffic conditions on the first road and the second road and past meteorological data.

14. The toll control method according to claim 8, wherein
in the outputting, by inputting the predicted overall traffic volume and a predetermined road toll into a state model defining a relationship between traffic volume on the second road, road toll and predicted traveling speed, a future traffic volume and a predicted traveling speed on the second road for the case where the toll on the second road is set to the predetermined road toll are output.

15. A non-transitory computer-readable recording medium that includes a program recorded thereon the program including instructions that cause a computer to carry out:
predicting a future overall traffic volume on a first road and a second road;
outputting, with a predicted traffic volume and a predetermined road toll as inputs, a future traffic volume and a predicted traveling speed on the second road for a case where the toll on the second road is set to the predetermined road toll; and
setting the road toll on the second road, wherein
in the setting, one or more road toll candidates are set, a road toll candidate for which a predicted traveling speed obtained by executing the step (b) using the road toll candidate as an input of the step (b) is greater than or equal to a threshold value is selected, and the road toll candidate that maximizes a toll revenue for the second road as calculated using the future traffic volume output in the executed step (b) is set as the road toll on the second road, among the selected road toll candidates.

16. The non-transitory computer-readable recording medium according to claim 15, wherein
in the outputting, a traffic density on the second road for the case where the toll on the second road is set to the predetermined road toll is further output, and
in the setting, a road toll candidate for which the predicted traveling speed output in the executed outputting is greater than or equal to the threshold value, and that satisfies an upper limit and a lower limit that are determined by the traffic density output in the executed outputting is selected.

17. The non-transitory computer-readable recording medium according to claim 15, wherein in the predicting, the overall traffic volume is predicted for every section set on the first road and the second road, in the outputting, with a traffic volume predicted for a specific section and a predetermined road toll as inputs, a future traffic volume and a predicted traveling speed on the specific section are output, and in the setting, the setting of one or more road toll candidates and the selection of road toll candidates are performed for every section, and the road toll candidate that maximizes the toll revenue for an entirety of the second road or for the section as calculated using the future traffic volume output in the executed outputting is taken as the road toll on the section, among the selected road toll candidates.

18. The non-transitory computer-readable recording medium according to claim 17, wherein in the setting, the future traffic volume output in the executed setting is multiplied by the road toll candidate used as an input in the executed outputting, for every section, to calculate the toll revenue for the section.

19. The non-transitory computer-readable recording medium according to claim 17, wherein in the setting, for every combination of an origin and a destination obtained using the origin and the destination of each of the sections, a weight is calculated using the traffic volume on the second road in the section corresponding to the combination, and the toll revenue for the entirety of the second road is calculated, using the calculated weights and the road toll candidate selected for every section.

20. The non-transitory computer-readable recording medium according to claim 15, wherein in the predicting, the overall traffic volume is predicted, using a predictive model built by machine learning that utilizes data specifying past traffic conditions on the second road and past meteorological data.

* * * * *